Oct. 16, 1962 G. W. OGDEN, JR 3,058,388
SPECTROSCOPIC APPARATUS
Filed March 1, 1961 2 Sheets-Sheet 1

INVENTOR.
GEORGE W. OGDEN, JR.
BY Morse & Altman
ATTORNEYS

Oct. 16, 1962    G. W. OGDEN, JR    3,058,388
SPECTROSCOPIC APPARATUS
Filed March 1, 1961    2 Sheets-Sheet 2

INVENTOR.
GEORGE W. OGDEN, JR.
BY
Morse + Altman
ATTORNEYS

United States Patent Office 3,058,388
Patented Oct. 16, 1962

3,058,388
SPECTROSCOPIC APPARATUS
George W. Ogden, Jr., Cambridge, Mass., assignor to Baird-Atomic, Inc., Cambridge, Mass., a corporation of Massachusetts
Filed Mar. 1, 1961, Ser. No. 92,555
10 Claims. (Cl. 88—14)

The present invention relates to spectroscopy and, more particularly, to absorption spectrophotometry in which a sequence of wavelengths, or more accurately wavelength intervals, are transmitted through or reflected from an unknown sample in order to determine its chemical composition. The different wavelengths and their intensities of radiation from the sample are indicative of its chemical composition.

In a typical infrared spectrophotometer, for example a wavelength continuum is directed through an unknown sample and a prism toward a photodetector. The system is designed for scanning in such a way that individual wavelengths of the resulting spectrum are received by the photodetector in sequence and the resulting varying signal is applied to a recording mechanism to control the relative position of a reciprocable pen with respect to a rotating chart. The rotation of the chart is synchronized with the scanning by which the sequential wavelengths are selected. Two problems arise in the operation of the recording mechanism, particularly the operation of the reciprocable pen and rotatable chart. First, the length of time necessary for scanning the short wavelength end of a wavelength sequence is greater than that necessary for scanning the long wavelength end because absorption bands are more common and give rise to more sudden operation of the recording mechanism at the short wavelength end than the long wavelength end. Second, for economy of time, it is desired to complete the wavelength scanning sequence as quickly as possible consistent with proper operation of the recording mechanism.

The primary objects of the present invention are: to provide a novel system for gradually increasing the scanning speed of a spectroscopic device of the foregoing type in order to take advantage of the decreasing length of time necessary for scanning longer wavelengths; and to provide a novel system for selectively suppressing the scanning speed of a spectroscopic device of the foregoing type in order to avoid unduly sudden operation of the recording mechanism.

Other objects of the present invention will in part be obvious and will in part appear hereinafter.

For a fuller understanding of the nature and objects of the present invention, reference should be had to the following detailed disclosure, taken in connection with the accompanying drawings, wherein.

Figure 1:
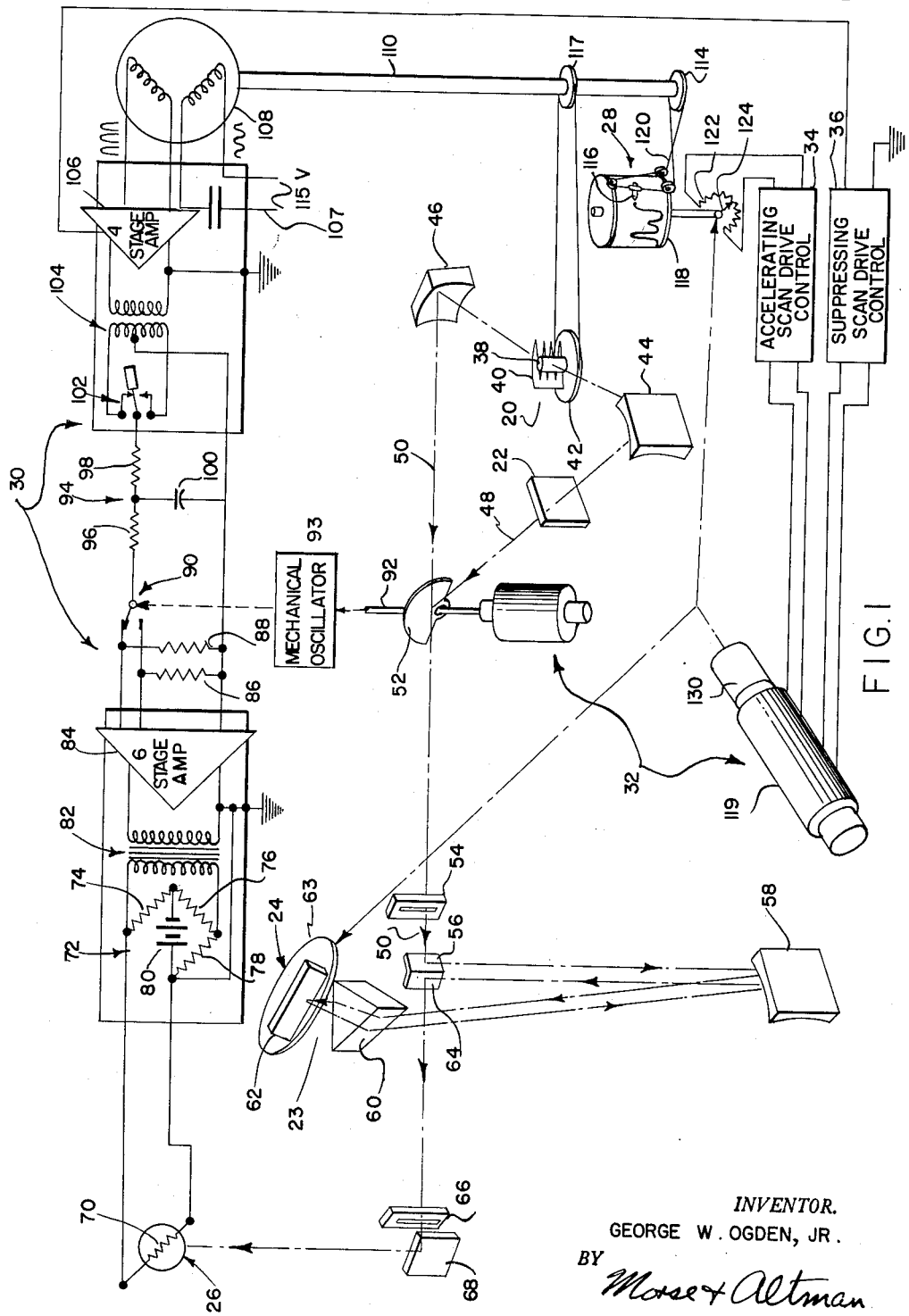
FIG. 1 is a schematic drawing of a spectrophotometer, partly electrical and partly mechanical, embodying the present invention.

Generally, the spectrophotometer of FIG. 1 comprises: a source component 20 for generating infrared radiation of a wide wavelength range for transmission through a sample 22 of unknown composition; a spectrum component 23 for dispersing a so-called line of this infrared radiation into a transverse continuum; an isolator component 24 for selecting individual sequential wavelengths of the spectrum; a photodetector component 26 which responds to the sequence of wavelengths from isolator component 24 to produce signals representative of the intensities of the sequence of wavelengths; and a recorder component 28 for producing a permanent visible indication of this sequence of intensities. A suitable electromechanical system 30 is provided to convert the signals from photodetector 26 to indicia via recorder component 28. A suitable drive component 32 is provided to operate various parts of isolator component 24, electromechanical system 30 and recorder component 28 in synchronism at predetermined speeds. In accordance with the present invention, the operation of drive component 32 is controlled by: (1) an accelerating scan system 34, shown in detail in FIG. 2, for continually accelerating the operation of isolator component 24 and recorder component 28 as longer wavelengths are selected: and (2) a suppressing scan system 36, shown in detail in FIG. 3, for slowing the operation of recorder component 28 and wavelength selection component 24 when large absorption variations are occurring.

Source component 20 includes a silicon carbide rod 38, which is heated to a sufficient black body temperature to produce a wide infrared wavelength range of the order of from 2 to 16 microns. Associated with rod 38 is a comb 40 mounted upon a rotatable disk 42 as part of recorder component 28 for a purpose to become apparent below. Radiation from silicon carbide rod 38 is directed to a pair of concave reflecting mirrors 44 and 46 and thence along a pair of paths 48 and 50. Radiation is directed alternately from paths 48 and 50 by a reflecting chopper 52 to the entrance slit 54 of spectrum component 23 in the following way. Chopper 52 is a pivoted semi-circular section blade. Chopper 52, when in one position, transmits radiation from path 50 toward entrance slit 54 and, in effect, misdirects radiation from path 48. Chopper 52, when in an opposite position, blocks radiation from path 50 and reflects radiation from path 48 toward entrance slit 54. Thus, chopper 52 causes first radiation from path 50 and then radiation from path 48 to advance through entrance slit 52 in alternating sequence. Radiation from path 50, which is unabsorbed by the sample, serves as reference radiation. Radiation from path 48, which passes through the sample, is compared with reference radiation 50 in a manner to be described below.

Spectrum component 23 and isolator component 24 constitute a monochromator for selecting one wavelength, or more precisely one short wavelength region, from the continuum falling on entrance slot 54. This entire continuum is transmitted through entrance slit 54, to a first 45° reflector 56, to a collimator mirror 58, through a prism 60 and to a mirror 62. From mirror 62, the continuum is transmitted back through prism 60 to collimator mirror 58, to a second 45° reflector 64. One wavelength of the continuum is directed through an exit slit 66, to a mirror 68 and to a bolometer 70, which is part of photodetector 26. In the foregoing system mirror 58 reconverges the beam on exit slit 66. Because of the dispersing action of prism 60, the continuous spectrum produced by prism 60 is spread out across the jaws of exit slit 66 and only a narrow band of wave lengths is passed by the slit between the jaws.

It will be recalled that sample beam 48 and reference beam 50 from source 20 are transmitted alternately through entrance slit 54 by chopper 52. A typical rotational velocity of chopper 52 is 10 cycles per second. In consequence, the energy incident on bolometer 70 alternates at a rate of 10 cycles per second. The alternating voltage produced across bolometer 70 is applied across a bridge circuit 72, which includes three resistors 74, 76 and 78 in series. A battery 80 is applied from positive to negative across resistors 76 and 78 in order to bias the junction between resistors 76 and 74 below ground. The junction between resistor 78 and battery 80 is at ground. By virtue of this arrangement, one terminal of bolometer 70 is at ground and the other terminal fluctuates in instantaneous potential in response to the modulated infrared radiation input.

The resulting signal is applied across a transformer 82 to a suitable multistage amplifier 84. Two output leads of amplifier 84 are similarly coupled by resistors 86 and 88 to the outer breaker points of a synchronous rectifier 90, which is mechanically coupled to and operated in synchronism with chopper 52 through a suitable mechanical connection shown as chopper shaft 92. The inner breaker point of synchronous rectifier 90 is oscillated back and forth between the outer breaker points by a mechanical oscillating mechanism 93 that is operated by chopper shaft 92. Contact is made first with one outer breaker point and then with the other at a suitable rate, say 10 contacts with each outer breaker point per second. The phasing of the operation of the inner breaker point is such that it selects the positive half cycle from each outer breaker point if the sample energy is stronger than the reference energy, and selects the negative half cycle if the reference energy is stronger. This phasing is controlled by the remainder of the system as will now be described.

The resulting alternating current is filtered as at 94 by a pair of series resistors 96 and 94 and shunt capacitor 100. The terminals of filter 94 are applied to a vibrator 102 which converts the D.C. signal from filter 94 to a 60 cycle per second alternating current signal. This signal is applied through a coupling transformer 104 to a multistage servo amplifier 106. Servo amplifier 106, in conjunction with a reference A.C. input 107, operates a servo motor 108. The speed of the servo motor is dependent on the voltage input to the amplifier and the amplifier gain setting (not shown). The direction of the drive is dependent upon the polarity of the input from a servo amplifier 106. The servo motor includes a pair of stator coils, one of which receives the signal from the amplifier and the other of which receives the signal from A.C. input 107. By virtue of the fact that servo motor 108 operates through shaft 110 in one direction or the other depending upon the balance between the intensities of beams 48 and 50 from silicon carbide rod 38, comb 40, which is rotatable with pulley wheel 42, rotates more or less to attenuate beam 50. The operation is such that comb 40 rotates into the path of beam 50 to a degree that is sufficient to reduce the intensity of beam 50 to equality with the intensity of ray 48, which has been attenuated by passage through sample 22. As indicated above, recorder 28 includes a rotatable drum 118, which is rotated in synchronism with wavelength mirror 62 by drive motor 119. By virtue of the rotation of shaft 110, pulley wheel 114 determines the instantaneous position of a reciprocable pen 116 by a pulley line arrangement 120.

In accordance with the present invention, as indicated above, a scan drive control 34 is provided to increase the speed of the output of motor 119. Accelerating scan drive control 34 is operated by a suitable potentiometer 122, the output voltage of which is determined by a wiper 124. Wiper 124 is carried on a shaft, the rotational position of which is determined by the rotational position of drum 118. Also, a scan drive control 36 is provided to reduce the output speed of drive motor 119 whenever a voltage difference is exhibited by amplifier 106 as an indication that servo motor 108 is to be called upon to rotate and to reciprocate pen 116 relatively sharply. Details of accelerating scan drive control 34 and suppressing scan control drive 36 are shown in FIGS. 2 and 3, respectively.

Figure 2:
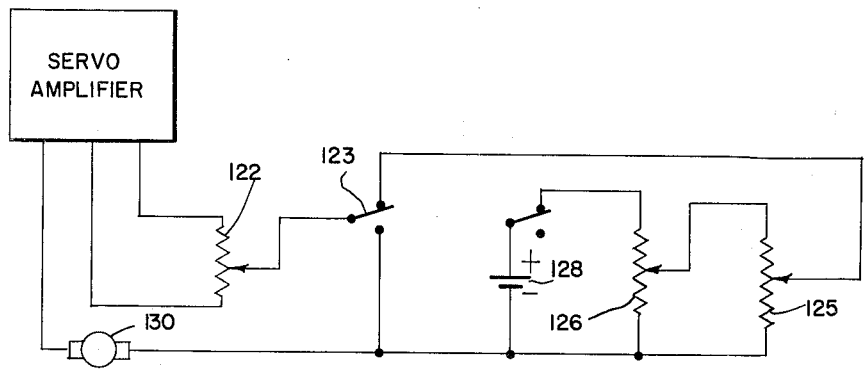
FIG. 2 is a schematic diagram of a component of the device of FIG. 1.

The accelerating scan drive circuit of FIG. 2 includes potentiometer 122, described above in connection with FIG. 1, a potentiometer 125 for adjusting minimum speed, a potentiometer 126 for adjusting maximum speed, a dry cell 128, for example a 15 volt transistor type, and associated wiring. The speed of the accelerating scan drive is regulated by the output voltage of a tachometer 130 coupled to the drive motor 119, for example, on the same shaft. This tachometer voltage is compared to a preset reference voltage and the speed of the motor is increased or decreased as required to make the two voltages equal. Any reference voltage from zero to maximum may be selected by means of a potentiometer. Thus, there is provided a continuous speed adjustment through a wide range. The device applies a voltage that varies from zero to maximum as the recorder drum rotates in opposition to the tachometer voltage. Thus, the effective tachometer voltage decreases as the scan progresses and the motor must run increasingly faster to provide the required output to balance the reference voltage. An additional potentiometer can be adjusted to permit the maximum accelerating voltage to be set at any value between zero and the maximum battery voltage to permit any desired degree of acceleration within the range of the servo system. As indicated above, potentiometer 122 is the speed control as well as the minimum speed control as well as the minimum speed adjustment, potentiometer 125 is the recorder driven acceleration control and potentiometer 126 is the maximum speed adjustment. In operation with switch 123 in the position shown, the slider on potentiometer 125 moves upward with rotation of recording drum 118, adding from zero to maximum voltage as determined by the potentiometer relationships.

Figure 3:
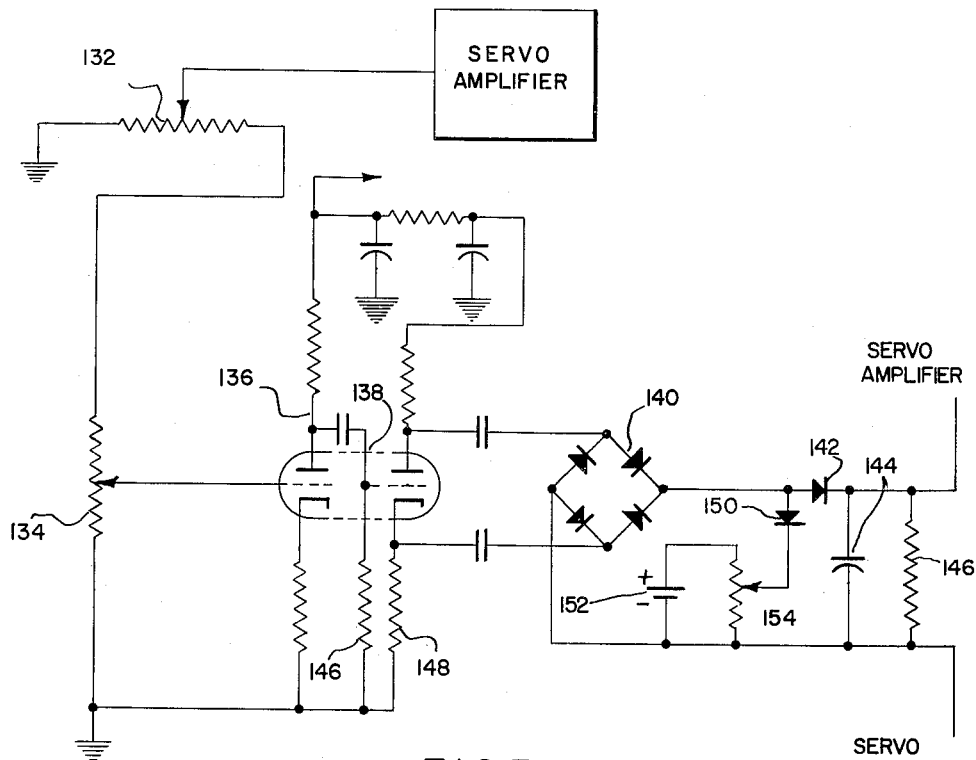
FIG. 3 is a schematic diagram of another component of the device of FIG. 1.

The suppressing scan drive control, shown at 36 in FIG. 1 and in detail in FIG. 3, causes the rapidly scanning instrument to decelerate as necessary to record the desired information, for example, when sharp absorption bands are encountered. It operates in conjunction with the tachometer controlled velocity servo drive shown at 119 in FIG. 1. The speed of the servo drive is regulated by the output voltage of tachometer 130 coupled to the drive motor. This tachometer voltage is compared to a preset reference voltage, and the speed of the motor is increased or decreased as required to make the two voltages equal. The reference voltage from zero to maximum may be selected by means of a potentiometer, thus providing a continuous speed adjustment through a wide range. The system now to be described applies a voltage that varies from zero to a preset maximum that is added to the tachometer output voltage as a function of the error signal of the recorder servo. Thus, an increase in the error signal, regardless of polarity or phase effectively increases the tachometer output voltage, and the motor must run more slowly to maintain the balance between tachometer and reference voltages.

In the diagram, the unbalance or error signal, appearing across the servo gain potentiometer 132, also appears across potentiometer 134 and is impressed upon the grid of the first half 136 of a twin triode vacuum tube. After an amplification of 20 to 100 times, this signal appears on the grid of the second half 138 of the twin triode vacuum tube. Stage 138 is a phase inverter, the output of which is full-wave rectified by a diode bridge 140. Regardless of the phase or polarity of the error signal, a positive going voltage will be impressed, through diode 142 upon capacitor 144 and resistor 146. Since resistor 146 is in series with the tachometer output in correct polarity, an increasing voltage across it will cause the drive motor to slow down. In the case of an increasing error signal, capacitor 144 is charged by the relatively low impedance source consisting of second stage 138, its grid and cathode and resistors 146 and 148. In consequence, the voltage across resistor 146 increases quickly. In the case of a decreasing error signal, as the servo is coming into balance, capacitor 144 cannot discharge through diode 142 but must discharge through the high impedance offered by resistor 146. In consequence, the voltage across resistor 146 decays slowly. This "differential time constant" is necessary to prevent the scan drive velocity servo from accelerating rapidly when the recorder servo has come to a balance (a zero error signal), for example, at the bottom of an infrared absorption band.

Also included is a biased diode circuit to prevent the suppression voltage from ever becoming large enough to completely stop the scan drive. Diode 150 is biased, by a 15 volt battery 152 and a potentiometer 154, to any desired voltage between 0 and 15 volts. As soon as the suppression voltage equals the preset bias voltage, it is effectively shorted out and does not appreciably exceed this value. This circuit can be modified by placing a 60 cycle twin T filter to feed back from the plate of the grid circuit of stage 136, providing sharp attenuation of all frequencies except 60 cycles (or any other desired frequency) by applying a quadrature "bucking" voltage to the cathode of second stage 138 in order to attenuate all out-of-phase voltages, or by replacing the battery-operated bias circuit by a rectified A.C. supply. For simplicity, these modifications have been omitted from FIG. 3.

In operation, assume that a sample 22 is placed in sample beam 48 and that this sample has a strong absorption at a particular wavelength. As drum 118 rotates and pen 116 approaches the position of this wavelength on the chart around the drum, wavelength mirror 62 also rotates advancing the wavelength in question to exit slit 66. Because at this wavelength, the sample beam is absorbed but reference beam 50 is not, bolometer 70 senses an unbalance. The resulting 10 cycle per second signal is amplified in voltage amplifier 84, rectified in synchronous rectifier 90, filtered by filter 94 and amplified again by servo amplifier 106. The servo motor 108 rotates and drives the comb 40 into the reference beam tending to equalize the energy in both beams 48 and 50 passing through entrance slit 54. At the same time the pen is driven down scale. When the scan reaches a wavelength at which the sample absorbs less strongly, the situation is reversed, the comb drives out of the beam and the pen drives up scale to complete the drawing of the absorption band on the chart. By virtue of the action of the accelerating scan drive control 34, as drum 118 rotates, wiper 124 of potentiometer 122 rotates to apply a gradually changing signal to drive motor 32. In consequence, the speed of scanning is gradually increased. The relatively rapid scanning effected by scanning motor 32, and increased gradually by accelerating scan drive control 34, is sharply slowed by suppressing scan drive control 36 in the vicinity of a wavelength absorption band of the type assumed above, whereby the accurate movement of pen 116 may occur betwen wide limits.

The illustrated example thus contemplates a double beam recording spectrophotometer characterized by an accelerating scan which is temporarily suppressed when necessary to secure proper resolution on the recording chart. It will be understood, however, that the accelerating scan drive and the suppressing scan drive may be used independently of each other in similar instruments.

Since certain changes may be made in the foregoing description without departing from the scope of the invention herein involved, the foregoing description is to be taken in an illustrative and not in a limiting sense.

What is claimed is:

1. Spectroscopic apparatus comprising a source of radiation of different wavelengths, means for directing said radiation through a sample, entrance slit means for receiving said radiation from said sample, dispersion means for dispersing said radiation from said entrance slit into a spectrum, exit slit means for selecting a limited wavelength interval of said spectrum, recording means for indicating the intensity of said radiation from said exit slit means, drive means for sequentially varying the selected wavelength interval directed through said exit slit at a predetermined speed, accelerating means for gradually increasing said speed as successive wavelength intervals are selected, and suppressing means for reducing said speed when the absorption by said sample of said sequential wavelengths varies significantly.

2. The spectroscopic apparatus of claim 1 wherein said dispersion means includes a prism.

3. The spectroscopic apparatus of claim 1 wherein said dispersion means includes a prism, said recording means includes a rotatable chart and said drive means causes said prism and said chart to rotate in synchronism.

4. Spectroscopic apparatus comprising a source of radiation of different wavelengths, means for directing said radiation through a sample, entrance slit means for receiving said radiation from said sample, dispersion means for dispersing said radiation from said entrance slit into a spectrum, exit slit means for selecting a limited wavelength interval of said spectrum recording means for indicating the intensity of said radiation from said exit slit means, drive means for sequentially varying the selected wavelength interval directed through said exit slit at a predetermined speed, and accelerating means for gradually increasing said speed as successive wavelength intervals are selected, said dispersion means including a prism, said recording means including a rotatable chart, the rotational position of said chart controlling a potentiometer operatively connected to said accelerating means.

5. Spectroscopic apparatus comprising a source of radiation of different wavelengths, means for directing said radiation through a sample, entrance slit means for receiving said radiation from said sample, dispersion means for dispersing said radiation from said entrance slit into a spectrum, exit slit means for selecting a limited wavelength interval of said spectrum recording means for indicating the intensity of said radiation from said exit slit means, drive means for sequentially varying the selected wavelength interval directed through said exit slit at a predetermined speed, and accelerating means for gradually increasing said speed as successive wavelength intervals are selected, said dispersion means including a prism, said recording means including a rotatable chart, the rotational position of said chart controlling said accelerating means.

6. Spectroscopic apparatus comprising a source of radiation of different wavelengths, means for directing said radiation through a sample, entrance slit means for receiving said radiation from said sample, dispersion means for dispersing said radiation from said entrance slit into a spectrum, exit slit means for selecting a limited wavelength interval of said spectrum, recording means for indicating the intensity of said radiation from said exit slit means, drive means for sequentially varying the selected wavelength interval directed through said exit slit at a predetermined speed, and suppressing means for reducing said speed when suppressing said speed when the absorption by said sample of said sequential wavelengths varies significantly.

7. The spectroscopic apparatus of claim 6 wherein said recording means includes a servo means responsive to changes in intensity of said radiation through said sample, said suppressing means being responsive to said servo means.

8. Spectroscopic apparatus comprising a source of radiation of different wavelengths, means for directing said radiation through a sample, entrance slit means for receiving said radiation from said sample, dispersion means for dispersing said radiation from said entrance slit into a spectrum, exit slit means for selecting a limited wavelength interval of said spectrum, recording means for indicating the intensity of said radiation from said exit slit means, drive means for sequentially varying the selected wavelength interval directed through said exit slit at a predetermined speed, accelerating means for gradually increasing said speed as successive wavelength intervals are selected, and suppressing means for reducing said speed when suppressing said speed when the absorption by said sample of said sequential wavelengths varies significantly, said dispersion means including a prism, said recording means including a rotatable chart and the rotatable position of said chart controlling a potentiometer operatively connected to said accelerating means.

9. Spectroscopic apparatus comprising a source of radiation of different wavelengths, means for directing said radiation through a sample, entrance slit means for receiving said radiation from said sample, dispersion means for dispersing said radiation from said entrance slit into a spectrum, exit slit means for selecting a limited wavelength interval of said spectrum, recording means for indicating the intensity of said radiation from said exit slit means, drive means for sequentially varying the selected wavelength interval directed through said exit slit at a predetermined speed, accelerating means for gradually increasing said speed as successive wavelength intervals are selected, and suppressing means for reducing said speed when suppressing said speed when the absorption by said sample of said sequential wavelengths varies significantly, said recording means including a servo means responsive to changes in intensity of said radiation through said sample, said suppressing means being responsive to said servo means.

10. The spectroscopic apparatus of claim 9, wherein said dispersion means includes a prism, said recording means includes a rotatable chart and the rotational position of said chart controls a potentiometer operatively connected to said accelerating means.

References Cited in the file of this patent

UNITED STATES PATENTS 2,813,451     Stickney _____ Nov. 19, 1957

FOREIGN PATENTS 814,071     Great Britain _____ May 27, 1959